US006880891B2

(12) United States Patent
Yetukuri et al.

(10) Patent No.: US 6,880,891 B2
(45) Date of Patent: Apr. 19, 2005

(54) HEAD RESTRAINT FOR SEAT (75) Inventors: Nagarjun Yetukuri, Rochester Hills, MI (US); Mladen Humer, Eastpointe, MI (US); Kenneth McQueen, Eastpointe, MI (US); Dale Smallwood, Clarkston, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 10/604,023

(22) Filed: Jun. 23, 2003

(65) Prior Publication Data

US 2005/0001463 A1 Jan. 6, 2005

(51) Int. Cl.⁷ .................................................. A47C 7/36
(52) U.S. Cl. ...................................... 297/410; 297/391
(58) Field of Search ................................ 297/410, 391, 297/216.12, 216.1, 408

(56) References Cited

U.S. PATENT DOCUMENTS

| 3,528,703 | A | * | 9/1970 | Ohta ........................... 297/391 |
| 3,547,486 | A | * | 12/1970 | Herzer et al. ................ 297/408 |
| 4,840,428 | A | | 6/1989 | Kobayashi et al. |
| 4,991,907 | A | * | 2/1991 | Tanaka ........................ 297/408 |
| 5,020,855 | A | | 6/1991 | Lindberg et al. |
| 5,290,091 | A | | 3/1994 | Dellanno et al. |
| 5,660,441 | A | * | 8/1997 | Nagayasu et al. ........... 297/408 |
| 5,816,658 | A | * | 10/1998 | Wallis ......................... 297/410 |
| 5,961,182 | A | | 10/1999 | Dellanno |
| 6,068,338 | A | * | 5/2000 | Takei et al. .................. 297/391 |
| 6,079,776 | A | | 6/2000 | Breitner et al. |
| 6,183,045 | B1 | * | 2/2001 | Marfilius et al. ........... 297/391 |
| 6,250,714 | B1 | * | 6/2001 | Nakano et al. ......... 297/216.12 |
| 6,402,238 | B1 | | 6/2002 | Bigi et al. |
| 6,460,926 | B1 | | 10/2002 | Neale |
| 6,523,902 | B1 | | 2/2003 | Robinson |
| 2001/0040396 | A1 | | 11/2001 | Kreuels et al. |
| 2002/0021033 | A1 | | 2/2002 | Bayer et al. |
| 2002/0060482 | A1 | | 5/2002 | Sakakibara et al. |
| 2003/0001413 | A1 | | 1/2003 | Albrecht |

FOREIGN PATENT DOCUMENTS

| FR | 2806985 | 10/2001 |
| FR | 2825668 | 12/2002 |
| GB | 1161330 | 11/1966 |

* cited by examiner

Primary Examiner—Milton Nelson, Jr.
(74) Attorney, Agent, or Firm—Bill C. Panagos (57) ABSTRACT

A vehicle seat includes a head restraint which limits the magnitude of neck deflection of a vehicle occupant during a rear impact collision. The head restraint includes a support member attached to the top of a head restraint post. The support member includes a convex surface shaped to substantially conform to the profile of an occupant's head and neck. The support member is covered by a resilient material such as foam. The foam thickness is reduced due to the presence of the support member. Reduced foam thickness in addition to the shape of the support member provides for reduced occupant neck deflection during a rear impact collision.

14 Claims, 7 Drawing Sheets

HEAD RESTRAINT FOR SEAT

BACKGROUND OF INVENTION

The present invention pertains generally to vehicle seats, and more particularly to a head restraint which minimizes a vehicle occupant's neck deflection during a rear impact event.

Occupants of motor vehicles have long suffered head, neck and spinal injuries during events such as rear vehicle impact or sudden deceleration. Typically, a vehicle head restraint is constructed with compressible foam surrounding a head restraint post. In a rear impact event, the occupant's head contacts the top of the vehicle head restraint with sufficient force to result in a significant deflection of the foam. The magnitude of neck deflection increases as the head further compresses the foam. Furthermore, because the foam is sufficiently resilient, the energy imparted to the foam by the occupant's head is mostly stored and not dissipated. As such, when the rear collision event has ended, the energy stored within the foam is released into the occupant's head which causes it to fling forward possibly causing further injury to the vehicle occupant.

Accordingly, it would be advantageous to provide a vehicle head restraint which includes a comfortable support surface during normal operation and a structure which limits the deflection of the occupant's neck during an event such as a rear impact collision. Furthermore, it would be advantageous to provide a head restraint including components which are easily adaptable for use with existing head restraint posts and seat structures. It would also be advantageous to provide a head restraint for a seat which may be economically constructed.

SUMMARY OF INVENTION

In accordance with the present invention, a head restraint for a vehicle seat limits the neck deflection of a vehicle occupant during a rear impact collision. In another aspect of the present invention, the head restraint includes a support member attached to the top of a head restraint post. The support member includes a convex surface shaped to substantially conform to the profile of an occupant's head and neck. The support member is covered by a resilient material such as foam. The foam thickness is minimized due to the presence of the support member. Minimized foam thickness in addition to the shape of the support member provides for minimized occupant neck deflection during a rear impact collision.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF DRAWINGS

The present invention will become more fully understood from the detailed description and the accompanying drawings, wherein.

DETAILED DESCRIPTION

The following description of the preferred embodiment is merely exemplary in nature and is in no way intended to limit the invention, its application, or uses.

Figure 1:
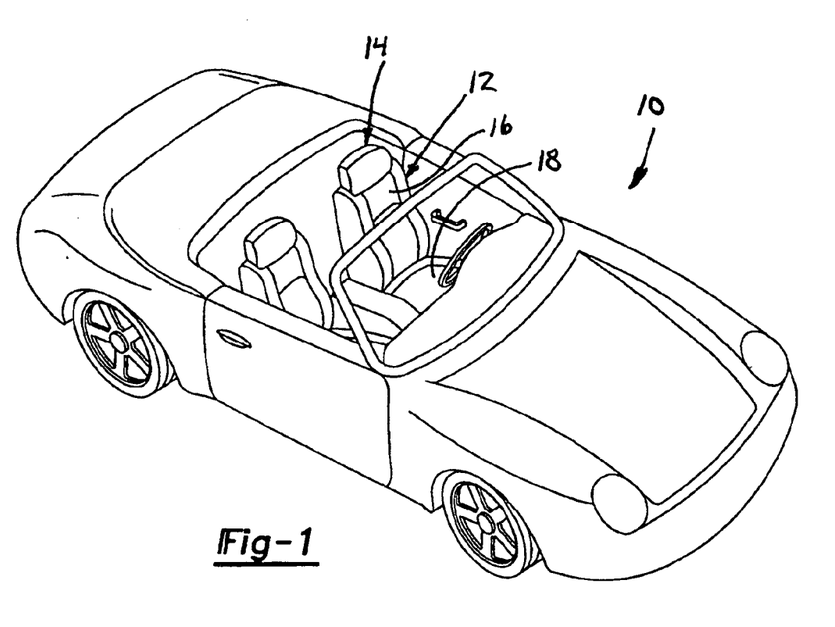
FIG. 1 is a perspective view of an exemplary vehicle equipped with a vehicle seat having a head restraint assembly constructed in accordance with the teachings of the present invention.

FIG. 1 depicts an exemplary motor vehicle 10 having a seat 12 constructed in accordance with the teachings of the present invention. Seat 12 includes a head restraint assembly 14, a seat back 16 and a seat bottom 18. Seat back 16 is pivotally coupled to seat bottom 18. Head restraint assembly 14 is adjustably coupled to seat back 16 such that the head restraint assembly may be vertically positioned relative to the seat back depending on the physical characteristics of the vehicle occupant. It should be appreciated that the "2-way" adjustable embodiment shown is merely exemplary and that the head restraint assembly of the present invention may be used in conjunction with a "4-way" adjustable seat and head restraint assembly without departing from the scope of the present invention.

Figure 2:
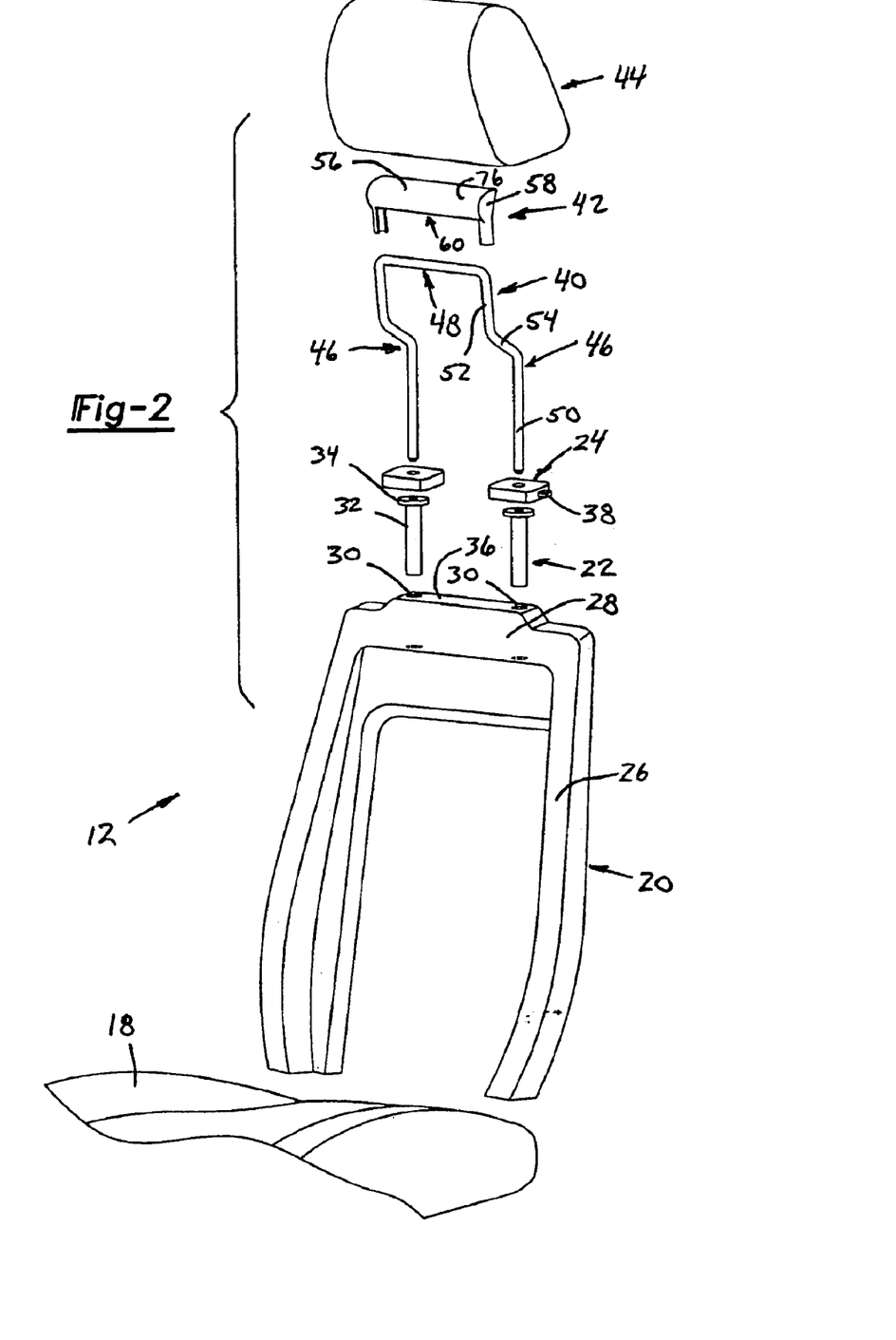
FIG. 2 is a partial exploded perspective view of a vehicle seat constructed in accordance with the teachings of the present invention.
Figure 3:
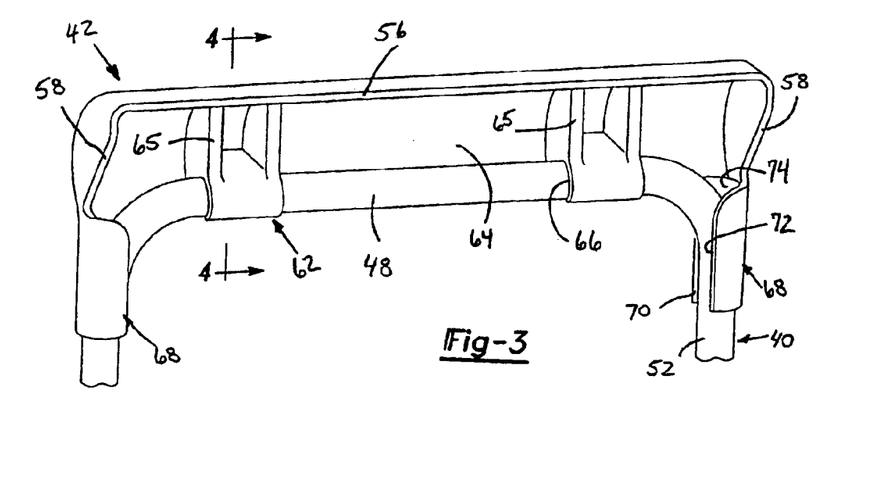
FIG. 3 is a partial perspective view of a support member and head restraint post of the seat assembly depicted in FIG. 2.
Figure 4:
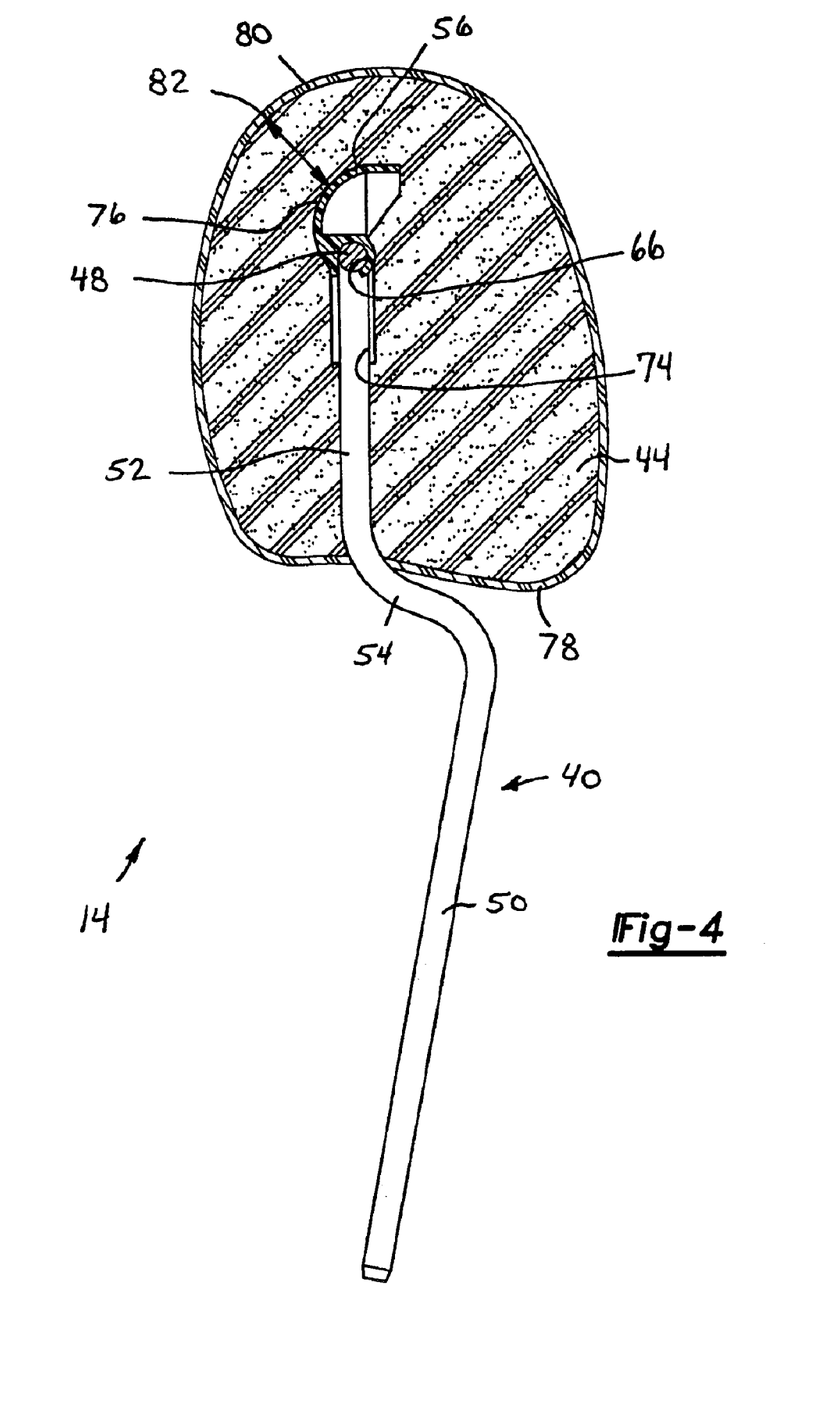
FIG. 4 is a cross-sectional side view of the head restraint assembly of the present invention.

FIGS. 2–4 depict seat back 16 including a frame 20, bushings 22 and end caps 24. Frame 20 includes a pair of side rails 26 interconnected by a top rail 28. Top rail 28 includes a pair of apertures 30 extending therethrough. Bushings 22 are positioned within apertures 30. Each bushing 22 includes a tubular segment 32 having a flange 34 positioned at one end. Tubular segments 32 extend through top rail 28. Each flange 34 abuts an upper surface 36 of top rail 28 when bushings 22 are mounted to frame 20. End caps 24 are coupled to bushings 22 and provide an aesthetically pleasing cover for the bushings. One of the end caps 24 includes a locking mechanism with a release lever 38 extending therefrom. The locking mechanism normally engages a portion of the head restraint assembly 14 to maintain the vertical position of the head restraint assembly relative to the seat back. If adjustment of the vertical height of the head restraint assembly relative to the seat back is desired, the vehicle occupant operates release lever 38 to disengage the locking mechanism and allow movement of head restraint assembly 14 relative to seat back 16.

Head restraint assembly 14 includes a head restraint post 40, a support member 42 and a pad 44. Head restraint post 40 is preferably constructed from a metal tube or rod bent to resemble the shape shown in the figures. Head restraint post 40 includes a pair of substantially parallel, vertically oriented leg portions 46 interconnected by a substantially horizontally oriented crossbar portion 48. Each leg portion 46 includes a seat back engaging section 50, a pad engaging section 52 and a transitional section 54 interconnecting seat back engaging section 50 and pad engaging section 52.

Support member 42 is preferably an injection molded plastic component. However, support member 42 may be constructed from sheet steel, aluminum or any other suitable structural material. Support member 42 includes an arcuate wall 56 bounded by end walls 58. Arcuate wall 56 and end walls 58 define a generally hollow shell 60. Inner clips 62 are integrally formed with and extend from an inner surface 64 of arcuate wall 56. Ribs 65 provide structural support for inner clips 62 along inner surface 64. Each inner clip 62 includes an inner arcuate surface 66 engaging crossbar portion 48 of head restraint post 40. Inner arcuate surface 66 defines an arc length greater than 180 degrees. Accordingly, inner clips 62 are snap-fit to crossbar portion 48 to retain support member 42 to head restraint post 40. Outer clips are formed integral with and adjacent to end walls 58 of support member 42. Each outer clip 68 includes an arcuate wall 70 having a slot 72 extending therethrough. Each wall 70 includes an inner surface 74 engaging a leg portion 46 of head restraint post 40. Inner surface 74 defines an arc length greater than 180 degrees to assist in retaining support member 42 to head restraint post 40.

Arcuate wall 56 of support member 42 includes an outer convex surface 76. Outer convex surface 76 defines a radius in the range of 10 to 60 millimeters. This radius range has been shown to be beneficial in distributing load imparted to head restraint assembly 14 by a vehicle occupant's head during a rear impact collision. A radius of 50 mm may be preferable. As was mentioned earlier, it is highly desirable to limit the maximum neck deflection of a vehicle occupant during a rear impact collision. By sizing convex surface 76 as previously described, the maximum deflection of the vehicle occupant's neck is reduced.

Pad 44 is preferably constructed from a urethane foam of a type typically used to make head restraint pads. Pad 44 encompasses support member 42 to provide an aesthetically pleasing and comfortable surface for supporting the vehicle occupant's head. Pad 44 may be separately molded and slit to accept support member 42 or may be directly injection molded over support member 42 and the uppermost section of head restraint post 40. A fabric cover 78 encloses pad 44. Pad 44 is sized and shaped to minimize the deflection of the vehicle occupant's neck during a rear end collision. Specifically, head restraint pad 44 includes an outer convex surface 80 spaced apart from outer convex surface 76 of support member 42. Outer convex surface 80 defines a radius sized to conform to the geometry of the posterior side of an occupant's head and neck. A thickness 82 of pad 44 located between outer convex surface 80 and outer convex surface 76 is defined to be in the range of 20 to 60 millimeters. This range of thickness assures that a vehicle occupant's head is sufficiently cushioned during the collision while at the same time assuring that load is transferred to support member 42 to resist further neck deflection of the vehicle occupant.

Figure 5:
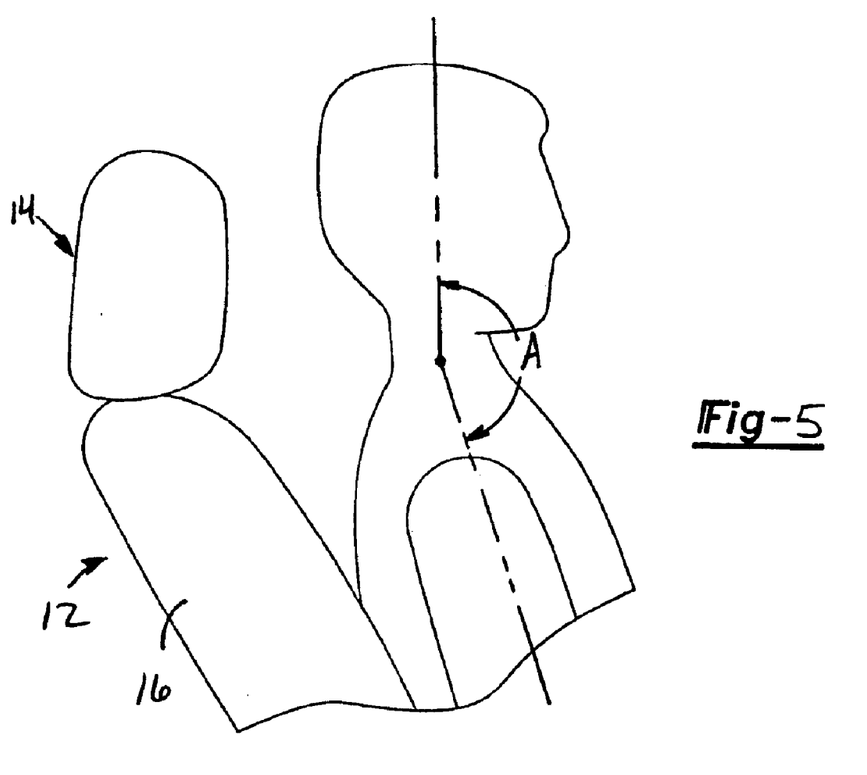
FIG. 5 is a schematic side view depicting a vehicle occupant in relation to a vehicle seat during normal operation of the vehicle.
Figure 6:
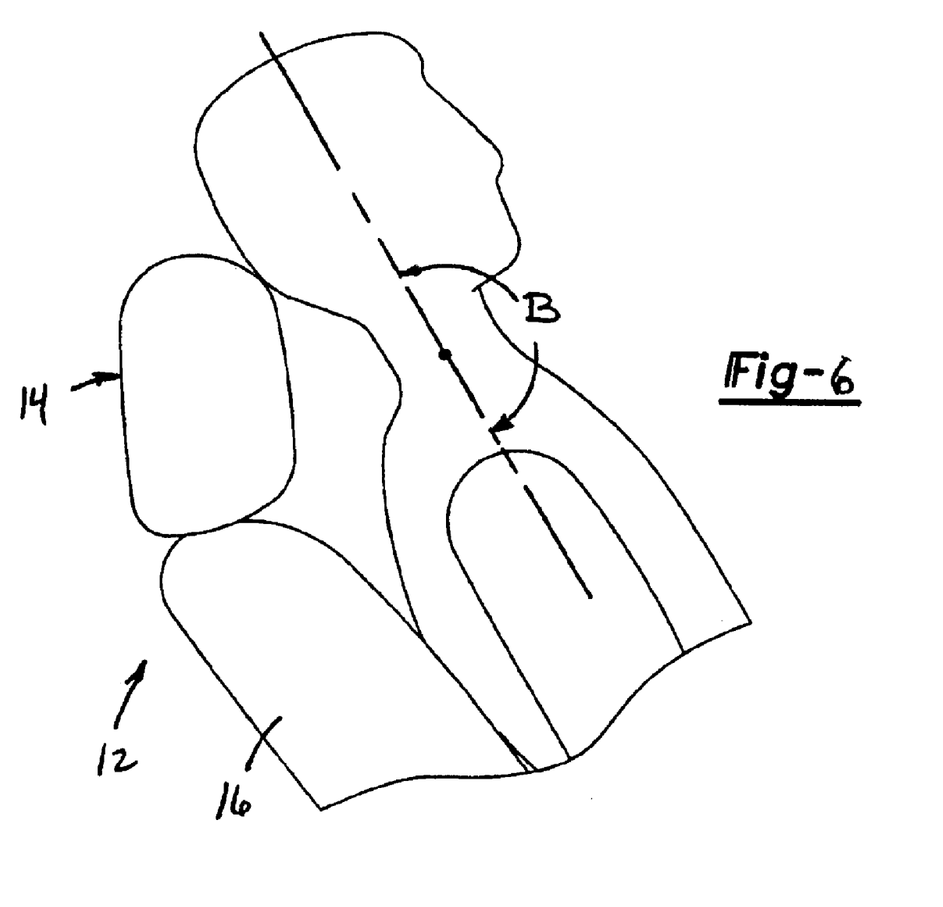
FIG. 6 is a schematic side view depicting the position of a vehicle occupant relative to the vehicle seat of the present invention during a rear impact collision.

FIGS. 5 and 6 depict the angular relation of a vehicle occupant's head to its torso before and during a rear impact collision. Specifically, angle A of FIG. 5 exists when the occupant is traveling in a vehicle under "normal" conditions. FIG. 6 shows the change in head to torso orientation as increased angle B. Because support member 42 effectively reduces thickness 82 of pad 44, the maximum neck-deflection is reduced. Furthermore, because support member 42 includes specifically sized outer convex surface 76, the magnitude of load imparted to the posterior side of the vehicle occupant's head is maintained within reasonable limits. Additionally, the amount of foam between the vehicle occupant's head and the support structure has been reduced by the present invention to store less energy within the foam during the rear impact event. As such, the tendency of the compressed foam to fling the vehicle occupant's head forward after the rear impact event is reduced.

Figure 7:
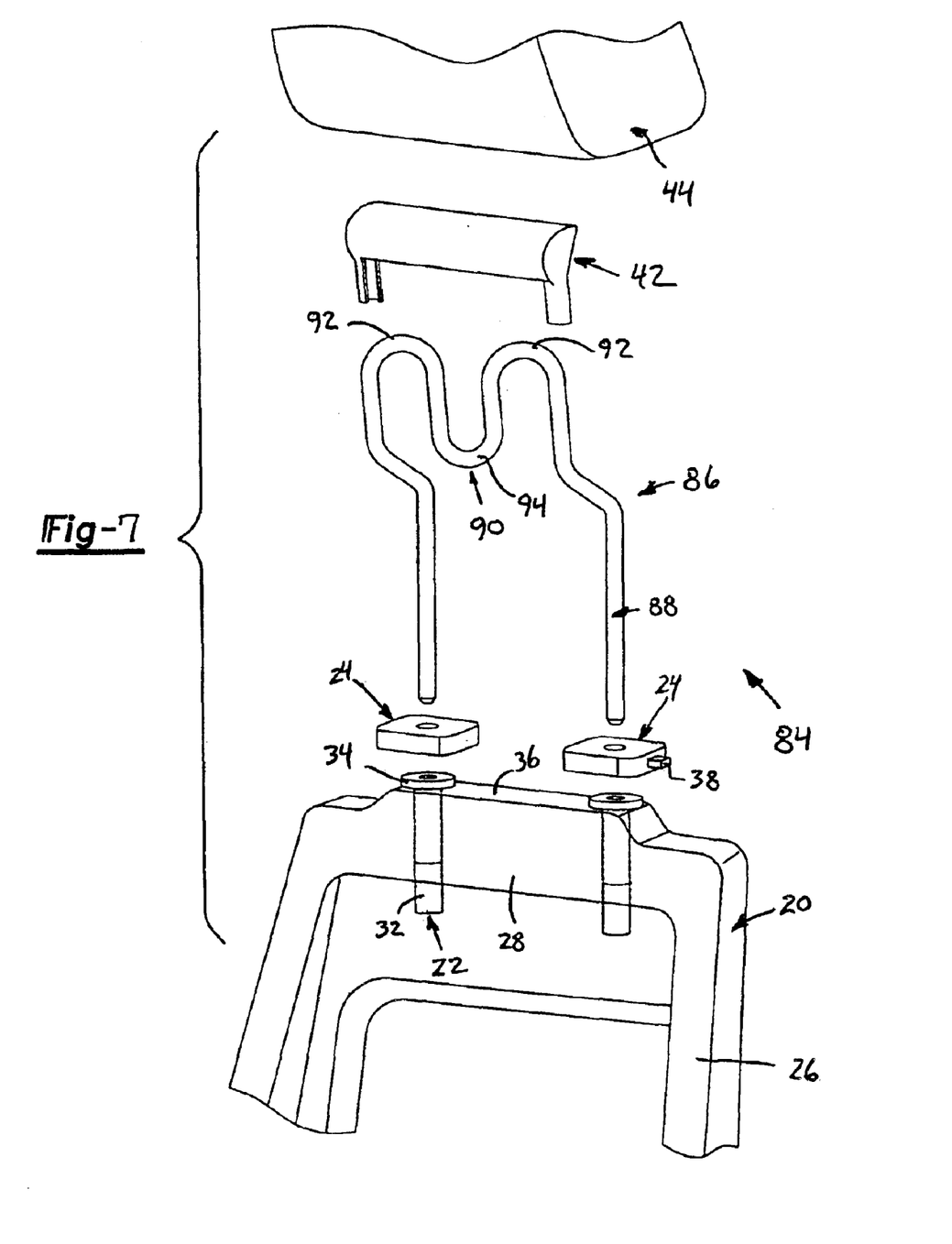
FIG. 7 is a partial exploded perspective view of an alternate embodiment seat assembly constructed in accordance with the teachings of the present invention.

FIG. 7 depicts an alternate embodiment seat 84. Alternate embodiment seat 84 is substantially similar to seat 12. Accordingly, like elements will maintain the previously introduced reference numerals. Seat 84 includes a head restraint post 86 including a pair of substantially parallel leg portions 88 interconnected by a crossbar portion 90. Crossbar portion 90 follows a serpentine shape having two peaks 92 interconnected by a trough 94. It should be appreciated that inner clips 62 of support member 42 are spaced apart to engage peaks 92 of head restraint post 86 or the corresponding locations of the crossbar portion 48 of head restraint post 40. By constructing support member 42 in this manner, a single support member may be used in seats utilizing either embodiment head restraint post.

Furthermore, the foregoing discussion discloses and describes merely exemplary embodiments of the present invention. One skilled in the art will readily recognize from such discussion, and from the accompanying drawings and claims, that various changes, modifications and variations may be made therein without departing from the spirit and scope of the invention as defined in the following claims. For example, head restraint post 40 may be formed from alternate materials such as aluminum, magnesium, plastic or any number of structural materials. Additionally, the head restraint post need not be formed as a unitary tubular structure, but may include rectangular cross-sectional portions, flanges and additional support brackets as deemed necessary without departing from the scope of the present invention.

What is claimed is:

1. A head restraint assembly for an occupant of a vehicle seat, the seat having a seat back and a seat bottom, the head restraint assembly comprising:

a head restraint post including a pair of leg portions and a crossbar portion interconnecting the leg portions, the leg portions being adapted to engage the seat back;

a support member coupled to the crossbar portion and each leg portion of the head restraint post, the support member including a laterally elongated convex surface and a plurality of clip portions wherein at least one clip portion is coupled to the head restraint post in a snap-fit arrangement; and a compressible pad at least partially encapsulating the support member, the pad including a convex outer surface to provide support for the occupant's head.

2. The head restraint assembly of claim 1 wherein the crossbar portion of the head restraint post includes a serpentine shape.

3. The head restraint assembly of claim 1 wherein at least one clip portion includes an arcuate surface engaging a portion of the head restraint post.

4. The head restraint assembly of claim 3 wherein the arcuate surface circumferentially extends greater than 180 degrees.

5. The head restraint assembly of claim 3 wherein at least one clip portion is integrally formed with and extends from the arcuate surface.

6. The head restraint assembly of claim 1 wherein the clip portions are spaced apart from one another such that two clip portions engage the crossbar portion and one clip portion engages each leg portion of the head restraint post.

7. The head restraint assembly of claim 1 wherein the convex surface of the support member defines a radius ranging from 10 to 60 millimeters.

8. The head restraint assembly of claim 1 wherein a thickness of the pad between the convex surface of the support member and the convex outer surface of the pad ranges from 20 to 60 millimeters.

9. A vehicle seat comprising:
   (a) a seat back having a frame and a pair of bushings coupled to the frame;
   (b) a seat bottom coupled to the seat back;
   (c) a head restraint assembly adjustably coupled to the seat back, the head restraint assembly including:
      (i) a head restraint post, the head restraint post including a pair of substantially parallel leg portions interconnected by a crossbar portion, each leg portion being supported by the seat back;
      (ii) a support member coupled to the head restraint post, the support member including a convex surface extending substantially along the entire length of the crossbar and a pair of end walls that cooperate with the convex surface to define a shell, the shell including a plurality of integrally formed clips; and
      (iii) a pad being positioned in contact with the convex surface of the support member;
   wherein the convex surface of the support member is offset from the seat back and positioned near a distal end of the vehicle seat.

10. The vehicle seat of claim 9 wherein the pad surrounds the support member.

11. The vehicle seat of claim 9 wherein each leg portion is slidably supported by one of the bushings.

12. The vehicle seat of claim 9 wherein the support member includes an arcuate wall and a rib extending between at least one integrally formed clip and the arcuate wall.

13. The vehicle seat of claim 9 wherein the clips are spaced apart from one another to engage different sections of the head restraint post.

14. The vehicle seat of claim 9 wherein one of the clips is formed adjacent one of the end walls to engage one of the leg portions of the head restraint post.

* * * * *